(12) United States Patent
Liu et al.

(10) Patent No.: US 10,931,326 B2
(45) Date of Patent: Feb. 23, 2021

(54) CASING ASSEMBLY AND MOBILE TERMINAL

(71) Applicant: Guangdong Oppo Mobile Telecommunications Corp., Ltd., Guangdong (CN)

(72) Inventors: Mengshuai Liu, Guangdong (CN); Bin Ji, Guangdong (CN); Zimei Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/579,599

(22) Filed: Sep. 23, 2019

(65) Prior Publication Data
US 2020/0195292 A1 Jun. 18, 2020

(30) Foreign Application Priority Data

Dec. 14, 2018 (CN) .......................... 201822110132.6

(51) Int. Cl.
*H04B 1/3888* (2015.01)
*H04B 1/38* (2015.01)

(52) U.S. Cl.
CPC ... *H04B 1/3888* (2013.01); *H04B 2001/3894* (2013.01)

(58) Field of Classification Search
CPC .................................................. H04B 1/3888
See application file for complete search history.

(56) References Cited

U.S. PATENT DOCUMENTS

| 2005/0253923 A1* | 11/2005 | Komori | H04N 5/2256 348/14.02 |
| 2010/0171234 A1* | 7/2010 | Lee | B29C 48/04 264/129 |
| 2012/0275025 A1* | 11/2012 | Parrill | G02B 23/16 359/511 |

(Continued)

FOREIGN PATENT DOCUMENTS

| CN | 102281342 A | 12/2011 |
| CN | 204206245 U | 3/2015 |
| CN | 205356418 U | 6/2016 |

(Continued)

OTHER PUBLICATIONS

Extended Europen Search Report for European Application No. 19201162.5 dated Feb. 4, 2020.

(Continued)

*Primary Examiner* — Hsinchun Liao (57) ABSTRACT

Casing assemblies and a mobile terminal are provided. A casing assembly includes: a rear casing and a wearproof assembly. The rear casing includes an outer surface and an inner surface opposite the outer surface, and the rear casing defines a mounting hole through the outer surface and the inner surface. The wearproof assembly includes a coupling member and a decorative member. The coupling member is coupled to the rear casing passing through the mounting hole, and defines a recess at a side of the coupling member opposite the inner surface. The decorative member is embedded in the recess. The coupling member and the decorative member protrude from the outer surface.

18 Claims, 8 Drawing Sheets

(56) References Cited

U.S. PATENT DOCUMENTS

2017/0302766 A1    10/2017    Lee et al.

FOREIGN PATENT DOCUMENTS

| CN | 106383556 A | 2/2017 |
| CN | 107608453 A | 1/2018 |
| CN | 108040445 A | 5/2018 |
| CN | 209233900 U | 8/2019 |
| EP | 3116204 A1 | 1/2017 |
| KR | 200462589 Y1 | 9/2012 |

OTHER PUBLICATIONS

International Search Report and Written Opinion for International Application No. PCT/CN2019/115398 dated Jan. 31, 2020.
Office Action for EP application 19201162.5 dated Nov. 6, 2020.
Office Action for IN application 201914039804 dated Aug. 19, 2020.

* cited by examiner

CASING ASSEMBLY AND MOBILE TERMINAL

CROSS-REFERENCE TO RELATED APPLICATION(S)

This application claims priority to Chinese Patent Application Serial No. 201822110132.6, filed on Dec. 14, 2018, the entire content of which is incorporated herein by reference.

TECHNICAL FIELD

The present disclosure relates to a technical field of mobile terminals, and more particularly, to a casing assembly and a mobile terminal.

BACKGROUND

A mobile terminal, such as a smartphone, is generally provided with a rear casing, and the mobile terminal shows its main appearance on the rear casing. There are issues of scratch and wear in case that the rear casing is in contact with external objects, due to a large superficial area of the rear casing.

SUMMARY

According to embodiments of a first aspect of the present application, a casing assembly is provided. The casing assembly includes a rear casing and a wearproof assembly. The rear casing includes an outer surface and an inner surface opposite the outer surface, and the rear casing defines a mounting hole through the outer surface and the inner surface. The wearproof assembly includes a coupling member and a decorative member. The coupling member is coupled to the rear casing passing through the mounting hole, and defines a recess at a side of the coupling member opposite the inner surface. The decorative member is embedded in the recess. The coupling member and the decorative member protrude from the outer surface.

According to embodiments of a second aspect of the present application, another casing assembly is provided. The casing assembly includes a rear casing and a wearproof assembly. The rear casing includes an outer surface and an inner surface opposite the outer surface, and the rear casing defines a mounting hole through the outer surface and the inner surface. The wearproof assembly includes a coupling member and a decorative member. The coupling member passes through the mounting hole and shields the mounting hole. The coupling member defines a groove at an end of the coupling member opposite the inner surface, and the decorative member is embedded in the groove. The coupling member and the decorative member protrude from the outer surface.

According to embodiments of a third aspect of the present application, a mobile terminal is provided. The mobile terminal includes: a casing assembly and a display screen. The casing assembly includes a rear casing and a wearproof assembly. The rear casing includes an outer surface and an inner surface opposite the outer surface, and the rear casing defines a mounting hole through the outer surface and the inner surface. The wearproof assembly includes a coupling member and a decorative member. The coupling member is coupled to the rear casing passing through the mounting hole, and defines a recess at a side of the coupling member opposite the inner surface. The decorative member is embedded in the recess. The coupling member and the decorative member protrude from the outer surface. The display screen has a display area, and the casing assembly is positioned at a side of the display screen facing away from the display area of the display screen.

BRIEF DESCRIPTION OF DRAWINGS

In order to illustrate the technical solution of embodiments of the present application or the technical solution of the related art more clearly, the drawings for description of the embodiments of the present application or the related art will be briefly introduced hereafter. Obviously, the following drawings illustrate only some embodiments, the person skilled in the art can obtain other drawings without creative work based on the drawings.

DETAILED DESCRIPTION

In order to facilitate better understanding of the present application, the present application will be described more comprehensively with reference to related accompanying drawings. The accompanying drawings illustrate preferred embodiments of the present application. The application may, however, be embodied in many different forms and should not be construed as limited to the embodiments set forth here. Rather, these embodiments are provided such that this disclosure of the present application will be thoroughly and completely understood.

A "terminal device" used herein includes, but is not limited to, a device capable of receiving and/or sending communication signals and coupled via one or more couplings as follows:

(1) a wired coupling, such as a public switched telephone network (PSTN), a digital subscriber line (DSL), a digital cable, a direct cable coupling; and (2) a wireless interface coupling, such as a cellular network, a wireless local area network (WLAN), a digital television network such as a DVB-H network, a satellite network, and an AM-FM broadcast transmitter.

The terminal device configured to communicate via the wireless interface can be referred to as "a mobile terminal". Examples of the mobile terminal include but are not limited to electronic devices as follows:

(1) a satellite or cellular telephone;

(2) a personal communication system (PCS) terminal capable of combining cellular radiotelephone with data processing, facsimile and data communication capabilities;

(3) a PDA integrated with a radiotelephone, a pager, an Internet/Intranet access, a Web browser, a notebook, a calendar, and a global positioning system (GPS) receiver;

(4) conventional laptop and/or palmtop receivers; and (5) conventional laptop and/or palmtop radiotelephone transceivers.

The present disclosure relates to a casing assembly. The casing assembly includes a rear casing and a wearproof assembly. The rear casing includes an outer surface and an inner surface opposite the outer surface, and the rear casing defines a mounting hole through the outer surface and the inner surface. The wearproof assembly includes a coupling member and a decorative member. The coupling member is coupled to the rear casing passing through the mounting hole, and defines a recess at a side of the coupling member opposite the inner surface. The decorative member is embedded in the recess. The coupling member and the decorative member protrude from the outer surface.

In at least one embodiment, the coupling member is configured to shield the mounting hole.

In at least one embodiment, the coupling member includes a body passing through the mounting hole and a boss positioned at a periphery of the body, the body and the boss are integrally formed, and the boss is positioned at a side where the inner surface is and the recess is positioned in the body.

In at least one embodiment, the coupling member includes a body passing through the mounting hole and coupled to the rear casing and a boss positioned at a periphery of the body, the body and the boss are integrally formed, and the boss is positioned at a side where the outer surface is and the recess is positioned in the boss.

In at least one embodiment, the rear casing includes an outer layer and an inner layer coupled to the outer layer, the outer surface is positioned at the outer layer, and the inner surface is positioned at the inner layer.

In at least one embodiment, the outer layer is transparent, the inner layer defines a light through hole, and ambient light can penetrate the outer layer from the outer surface and emit from a side of the inner surface through the light through hole.

In at least one embodiment, the coupling member is adhered to the inner surface of the rear casing by means of a double-sided tape or in a dispensing manner.

In at least one embodiment, portions of the decorative member and the coupling member protruding from the outer surface are rounded, such that the decorative member has a spherical exposed end face, and the coupling member has an end face protruding from the outer surface and capable of coupled to a spherical face of the decorative member.

In at least one embodiment, the decorative member has a cross sectional shape matches a cross sectional shape of the recess.

In at least one embodiment, the coupling member is made of stainless steel, aluminum alloy, ceramic, or plastic, and the decorative member is made of glass, ceramic, or plastic.

In at least one embodiment, the decorative member is made of transparent glass, and a pattern layer is arranged on a surface of the decorative member attached to a bottom of the recess.

The present disclosure relates to another casing assembly. The casing assembly includes a rear casing and a wearproof assembly. The rear casing includes an outer surface and an inner surface opposite the outer surface, and the rear casing defines a mounting hole through the outer surface and the inner surface. The wearproof assembly includes a coupling member and a decorative member. The coupling member passes through the mounting hole and shields the mounting hole. The coupling member defines a groove at an end of the coupling member opposite the inner surface, and the decorative member is embedded in the groove. The coupling member and the decorative member protrude from the outer surface.

In at least one embodiment, the decorative member is fixedly coupled to the coupling member by means of a double-sided tape or in a dispensing manner.

The present disclosure relates to a mobile terminal. The mobile terminal includes: a casing assembly and a display screen. The casing assembly includes a rear casing and a wearproof assembly. The rear casing includes an outer surface and an inner surface opposite the outer surface, and the rear casing defines a mounting hole through the outer surface and the inner surface. The wearproof assembly includes a coupling member and a decorative member. The coupling member is coupled to the rear casing passing through the mounting hole and defines a recess at a side of the coupling member opposite the inner surface. The decorative member is embedded in the recess. The coupling member and the decorative member protrude from the outer surface. The display screen has a display area, and the casing assembly is positioned at a side of the display screen facing away from the display area of the display screen.

In at least one embodiment, the rear casing includes an outer layer and an inner layer coupled to the outer layer, the outer surface is positioned at the outer layer, the inner surface is positioned at the inner layer, the outer layer is transparent, the inner layer defines a light through hole, the mobile terminal includes a camera module positioned at a side of the rear casing facing away from the outer surface, ambient light can penetrate the outer layer from the outer surface and emit to the camera module through the light through hole.

In at least one embodiment, the coupling member includes a body passing through the mounting hole and a boss positioned at a periphery of the body, the body and the boss are integrally formed, and the boss is positioned at a side where the inner surface is and the recess is positioned in the body.

In at least one embodiment, the decorative member has a circular, rectangular, or triangular cross section, and the body has a circular, rectangular, or triangular cross section.

In at least one embodiment, the coupling member includes a body passing through the mounting hole and coupled to the rear casing and a boss positioned at a periphery of the body, the body and the boss are integrally formed, and the boss is positioned at a side where the outer surface is and the recess is positioned in the boss.

In at least one embodiment, the coupling member is configured to shield the mounting hole.

In at least one embodiment, the camera module has a light hole, the light hole has an orthographic projection on the outer surface of the rear casing, the wearproof assembly has an orthographic projection on the outer surface of the rear casing, and the orthographic projection of the light hole is outside the orthographic projection of the wearproof assembly.

Figure 1:
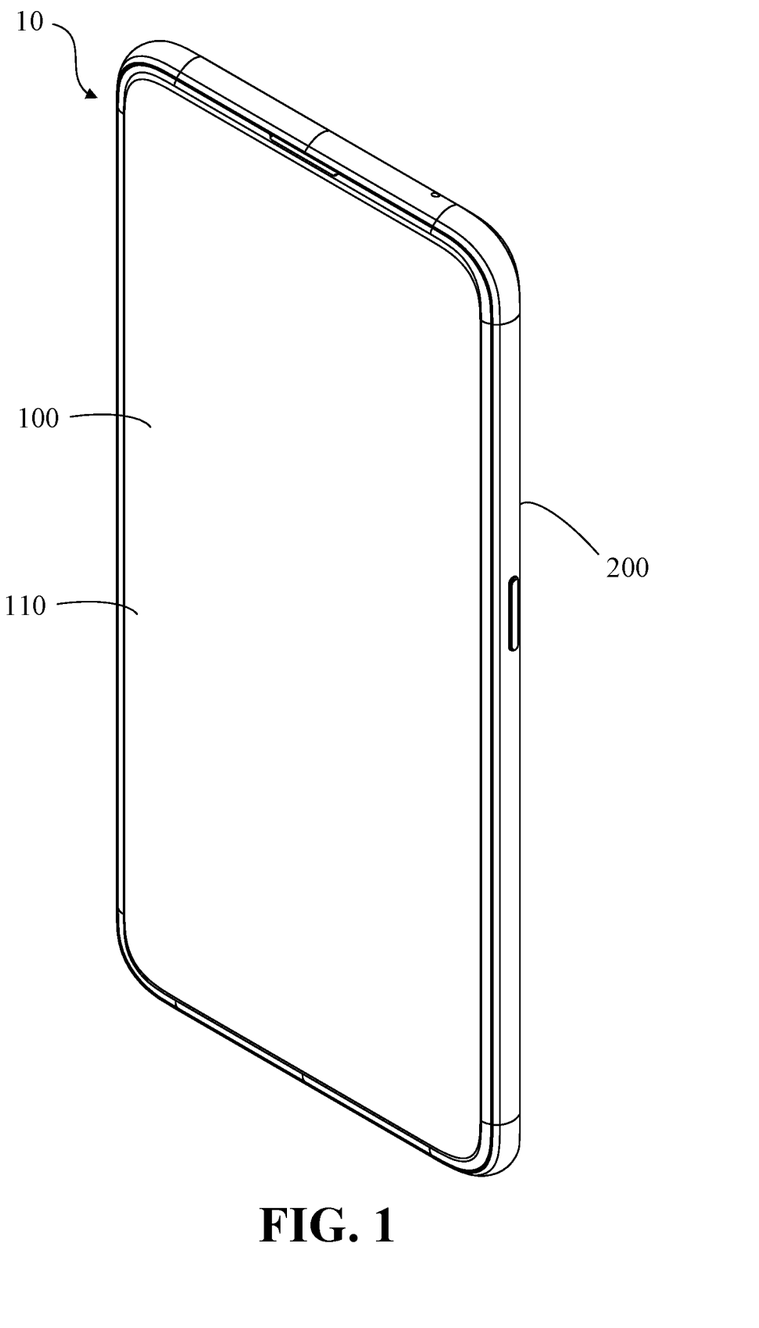
FIG. 1 illustrates a perspective view of a mobile terminal of an embodiment.

As illustrated in FIG. 1, in an embodiment, a mobile terminal 10 is a smart phone. The mobile terminal 10 includes a terminal device 100 and a casing assembly 200, and the casing assembly 200 is coupled to the terminal device 100. Specifically, the terminal device 100 may include a display screen 110 and a camera module (not shown). The display screen 110 may be configured to display information and provide a user with an interaction interface. The camera module may be configured to capture photographs, videos, or perform video phone, etc. The casing assembly 200 is positioned at a side of the display screen 110 facing away from a display area of the display screen 110. The display screen 110 and the casing assembly 200 may define a space therebetween for mounting a battery, a circuit board, and other electronic components of the mobile terminal 10. A processor, a baseband chip, a storage chip, and a power management module, etc. for the mobile terminal 10 can be integrated on the circuit board. The casing assembly 200 covers the circuit board, the battery, and the camera module of the terminal device 100, so as to protect the electronic components of the terminal device 100. The casing assembly 200 may also have a decorative effect, thereby beautifying appearance of the mobile terminal 10. In other embodiments, the mobile terminal 10 may be a tablet computer, etc.

Figure 2:
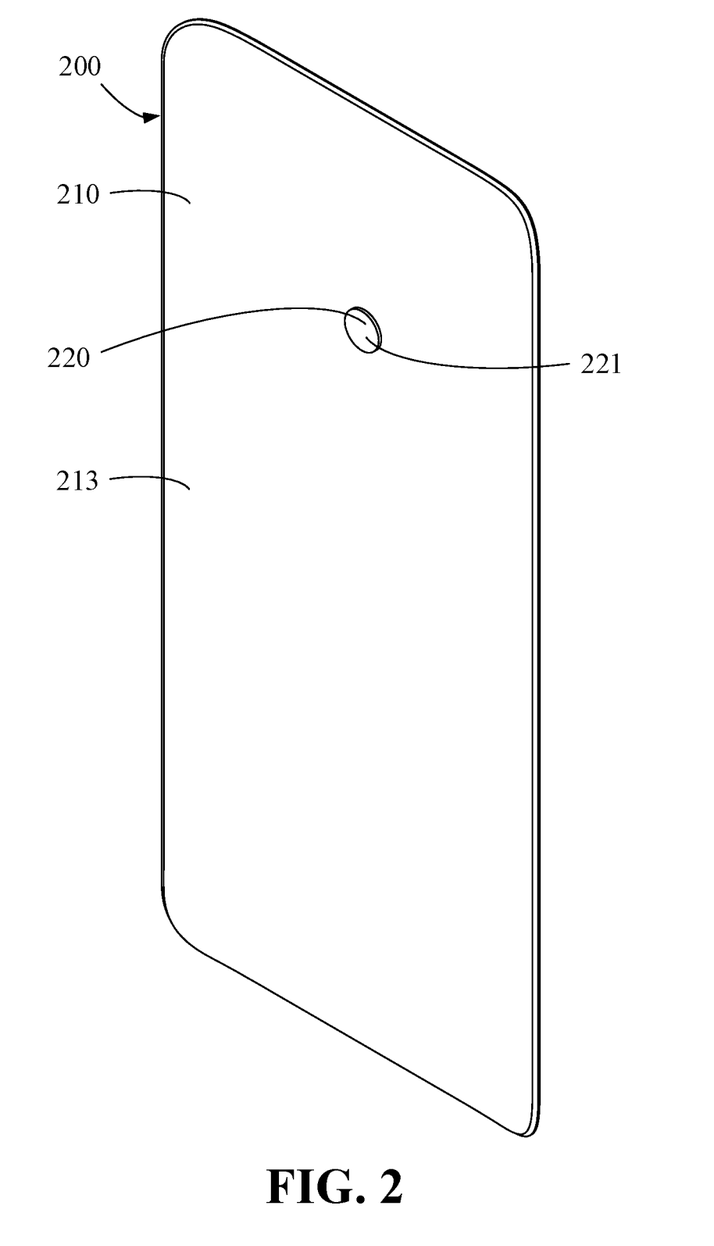
FIG. 2 illustrates a perspective view of a rear casing in an embodiment of the mobile terminal illustrated in FIG. 1.
Figure 3:
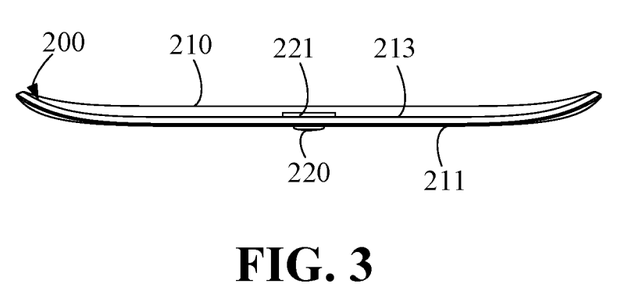
FIG. 3 illustrates a top view of the rear casing of the mobile terminal illustrated in FIG. 2.
Figure 4:
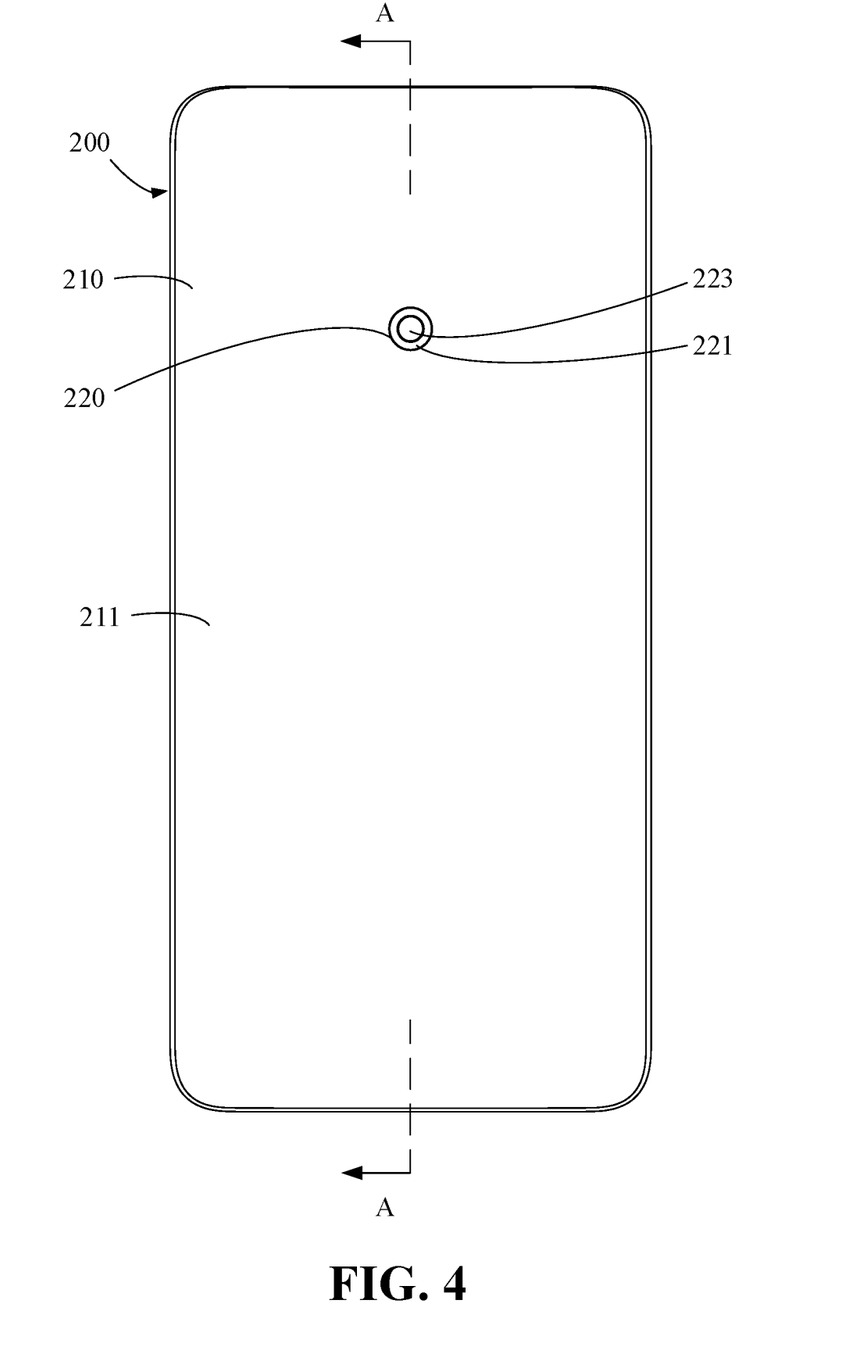
FIG. 4 illustrates a front view of the rear casing of the mobile terminal illustrated in FIG. 2.
Figure 5:
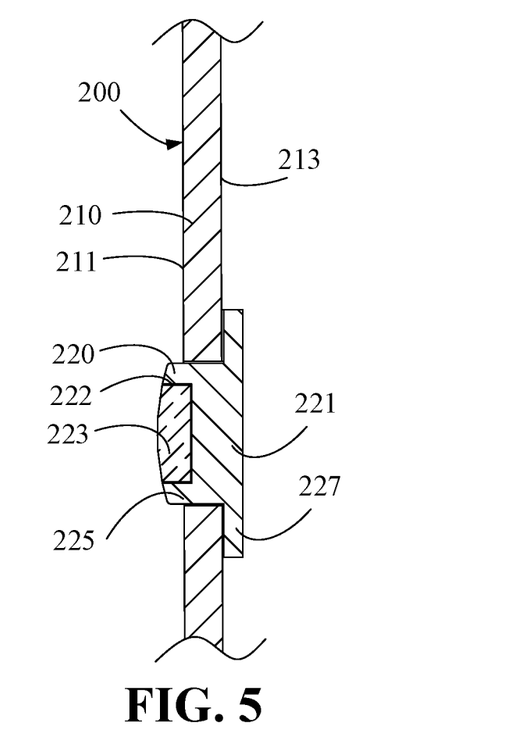
FIG. 5 illustrates a sectional view of the rear casing of the mobile terminal illustrated in FIG. 4 along line A-A.

As illustrated in FIG. 2 and FIG. 3, the casing assembly 200 includes a rear casing 210 and a wearproof assembly 220. The rear casing 210 includes an outer surface 211 and an inner surface 213 opposite the outer surface. The rear casing 210 defines a mounting hole through the outer surface 211 and the inner surface 213. Specifically, after the casing assembly 200 is mounted to the terminal device 100, the outer surface 211 of the rear casing 210 provides a surface which the user can directly touch. As illustrated in FIG. 4 and FIG. 5, the wearproof assembly 220 includes a coupling member 221 and a decorative member 223 coupled to the coupling member 221. The coupling member 221 passes through the mounting hole and shields the mounting hole, and the coupling member 221 is fixedly coupled to the rear casing 210. The coupling member 221 and the decorative member 223 protrude from the outer surface 211. It could be understood that, in the embodiments of the present application, the term "shield" means that the coupling member 221 can block ambient light. For instance, the wearproof assembly 220 has an overall light transmittance of zero or a low overall light transmittance, such that all or most of the ambient light cannot penetrate the wearproof assembly 220 to a side where the inner surface 213 is. The camera module of the terminal device 100 has a light hole, the light hole has an orthographic projection on the outer surface 211 of the rear casing 210, the wearproof assembly 220 has an orthographic projection on the outer surface 211 of the rear casing 210, the orthographic projection of the light hole is outside the orthographic projection of the wearproof assembly 220, that is the wearproof assembly 220 is not used to introduce light to the camera module.

In an embodiment, the coupling member 221 is adhered to the inner surface 213 of the rear casing 210 by means of a double-sided tape or in a dispensing manner, such that the coupling member 221 is reliably coupled to the rear casing 210. As illustrated in FIG. 5, the coupling member 221 defines a recess 222 at a side of the coupling member opposite the inner surface 213, and the recess 222 is exposed to a side where the outer surface 211 is. The decorative member 223 is embedded in the recess 222 and fixedly coupled to the coupling member 221. The decorative member 223 can be coupled to the coupling member 221 by means of a double-sided tape or in a dispensing manner, such that the decorative member 223 can be reliably coupled to the coupling member 221 as one piece. Furthermore, as illustrated in FIG. 5, in an embodiment, the coupling member 221 includes a body 225 and a boss 227 which are integrally formed. The body 225 and the boss 227 are in the shape of cylinder. The boss 227 is positioned at a periphery of the body 225, and the body 225 passes through the mounting hole, while the boss 227 is positioned at the side where the inner surface 213 is. The recess 222 is positioned in the body 225. The recess 222 has a circular cross section, and the decorative member 223 has a circular cross section matching the recess 222, such that the decorative member 223 can be embedded in the recess 222. A double-sided tape or an adhesive dispensing layer can be further provided between the boss 227 and the inner surface 213 of the rear casing 210, such that the coupling member 221 is fixedly coupled to the rear casing 210. With the above structure, the wearproof assembly 220 can be mounted in the mounting hole from the side where the inner surface 213 of the rear casing 210 is, which is beneficial for assembly of the wearproof assembly 220 and the rear casing 210.

In another embodiment, the coupling member 221 includes a body 225 and a boss 227 which are integrally formed. The body 225 and the boss 227 are in the shape of cylinder. The boss 227 is positioned at a periphery of the body 225, the body 225 passes through the mounting hole and is coupled to the rear casing 210, and the boss 227 is positioned at the side where the outer surface 211 is. The recess 222 is positioned in the boss 227. The recess 222 has a circular cross section, and the decorative member 223 has a circular cross section matching the recess 222, such that the decorative member 223 can be embedded in the recess 222. A double-sided tape or an adhesive dispensing layer can be further provided between the boss 227 and the outer surface 211 of the rear casing 210, such that the coupling member 221 is fixedly coupled to the rear casing 210. With the above structure, the wearproof assembly 220 can be mounted in the mounting hole from the side where the outer surface 211 of the rear casing 210 is, which is also beneficial for assembly of the wearproof assembly 220 and the rear casing 210.

In an embodiment illustrated in FIG. 5, the decorative member 223 has a circular cross section, and the body 225 has an annular portion defining the recess 222. In other embodiments, the cross section of the decorative member 223 may be rectangular, triangular, pentagonal, hexagonal, or heart-shaped, etc. The cross section of the body 225 may be rectangular, triangular, pentagonal, hexagonal, or heart-shaped, etc. With design of the shapes of the coupling member 221 and the decorative member 223, diversified decorative effects can be achieved by cooperation therebetween, thereby improving the appearance of the mobile terminal 10. In an embodiment, portions of the decorative member 223 and the coupling member 221 protruding from the outer surface 211 are rounded, such that the decorative member 223 has a spherical exposed end face, and the coupling member 221 has an end face protruding from the outer surface 211 and capable of coupled to a spherical face of the decorative member 223, achieving a comparatively rounded decorative effect.

The coupling member 221 can be made of stainless steel, aluminum alloy, ceramic, or plastic, etc. A surface of the coupling member 221 may achieve diversified decorative effects through surface treatment process. For instance, for the metal coupling member 221, the surface thereof can be treated by processes, such as anodic oxidation, physical vapor deposition (PVD), or electroplating, etc., thereby intensifying a surface property of the coupling member 221 and enabling the surface of the coupling member 221 to show some decorative effect. For the nonmetal coupling member 221, the surface thereof can be treated by processes, such as spraying, etc., thereby intensifying the surface property of the coupling member 221 and enabling the surface of the coupling member 221 to show some decorative effect. The decorative member 223 can be made of metal, such as brass, aluminum alloy, etc., or nonmetal, such as glass, ceramic and plastic, etc. The surface of the decorative member 223 may be provided with copywriting, such as a LOGO, etc. and texture thereon, thereby decorating the mobile terminal 10 in a better way. For instance, in an embodiment in which the decorative member 223 is made of glass, the decorative member 223 may be made of transparent glass, and a pattern layer is arranged on a surface of the decorative member 223 attached to a bottom of the recess 222. The decorative member 223 can form a three-dimensional pattern effect by means of light refraction and reflection, to improve the appearance of the mobile terminal 10.

In the above casing assembly 200, since the coupling member 221 and the decorative member 223 of the wearproof assembly 220 protrude from the outer surface 211 of the rear casing 210, when a side of the casing assembly 200 of the mobile terminal 10 is arranged on a support, such as a table, the wearproof assembly 220 at the side of the casing assembly 200 where the outer surface 211 is can reduce a contact area between the outer surface 211 of the rear casing 210 and the support, thereby reducing a probability of scratching and wearing on the rear casing 210. In an embodiment illustrated in FIG. 4, one wearproof assembly 220 is provided, while in other embodiments, a plurality of wearproof assemblies 220 may be provided. For instance, as an embodiment, four wearproof assemblies 220 are provided and mounted at four corners of the rear casing 210, such that the wearproof assembly 220 can protect the rear casing 210 from scratching or wearing in a better way.

Figure 6:
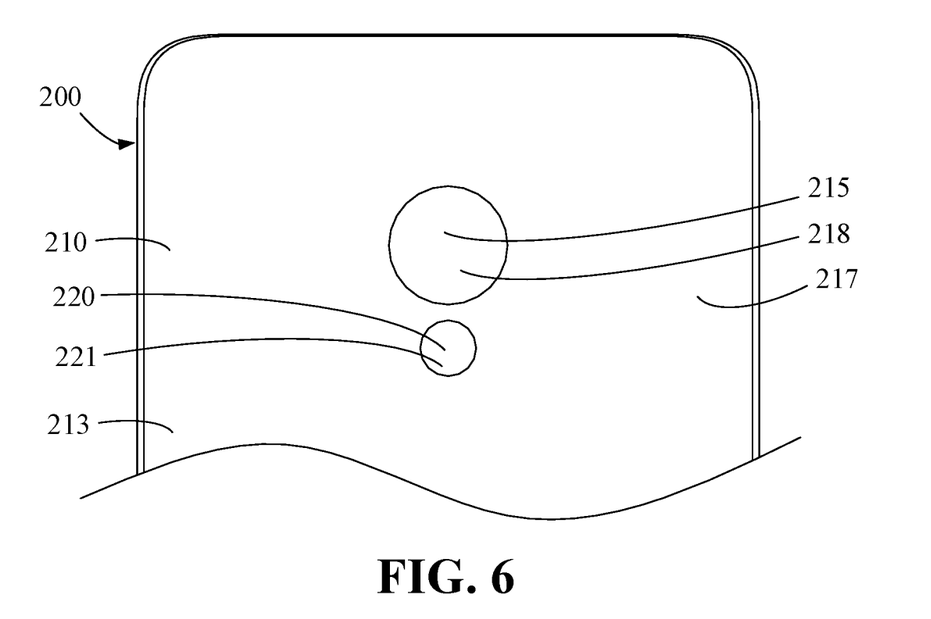
FIG. 6 illustrates a rear view of a rear casing in another embodiment of the mobile terminal illustrated in FIG. 1.
Figure 7:
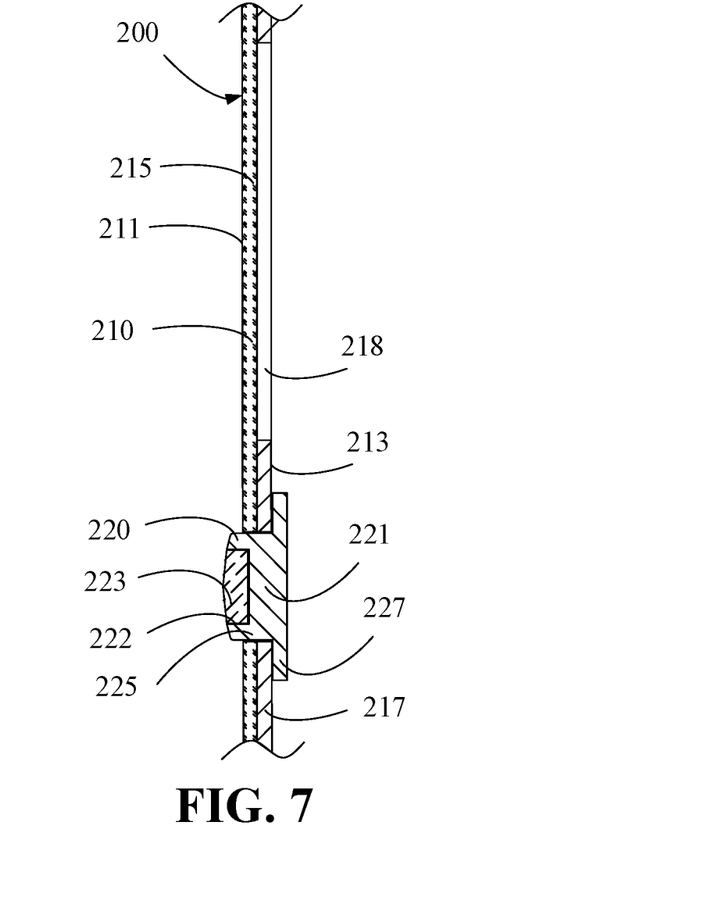
FIG. 7 illustrates a sectional view of the rear casing of the mobile terminal illustrated in FIG. 6.

As illustrated in FIG. 6 and FIG. 7, in an embodiment, the rear casing 210 includes an outer layer 215 and an inner layer 217 coupled to the outer layer 215. The outer surface 211 is positioned at the outer layer 215, and the inner surface 213 is positioned at the inner layer 217. The inner layer 217 can be made of metal, such as aluminum alloy, magnesium alloy, and stainless steel, etc., or nonmetal, such as plastic and ceramic, etc. The outer layer 215 can be made of glass or a material having a good light transmittance performance, such as plastic and optical coating, etc. The outer layer 215 is transparent with a light transmittance of more than 90%. The inner layer 217 defines a light through hole 218, and the ambient light can penetrate the outer layer 215 from the outer surface 211 and emit from the side of the inner surface 213 through the light through hole 218. The outer layer 215 is wearproof to some extent, the inner layer 217 can be therefore protected from wearing in a better way. The inner layer 217 can be made of a material having a high strength, such that the rear casing 210 has a high strength. After assembly between the casing assembly 200 and the terminal device 100, the camera module is positioned at the side of the rear casing 210 facing away from the outer surface 211, the ambient light can penetrate the outer layer 215 from the outer surface 211 and emit to the camera module through the light through hole 218. The mobile terminal 10 with the above structure can has a comparatively integral appearance, because the wearproof assembly 220 may be made comparatively small without a large occupied area on the outer surface 211 of the rear casing 210, and the side of the rear casing 210 where the outer surface 211 is can have an unexceptionable integral appearance. It could be understood that, the inner layer 217 may be omitted.

Figure 8:
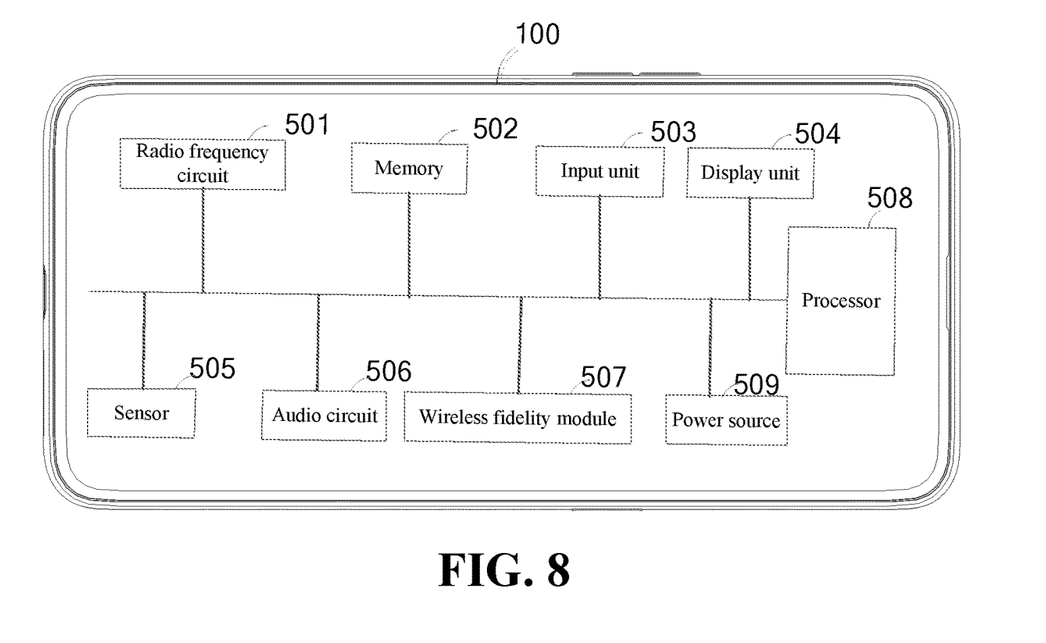
FIG. 8 illustrates a schematic view of a terminal device in an embodiment of the present disclosure.

As illustrated in FIG. 8, which is a schematic view of a terminal device 100 provided by an embodiment of the present application. The terminal device 100 may include a radio frequency (RF) circuit 501, a memory 502 including one or more computer readable storage mediums, an input unit 503, a display unit 594, a sensor 505, an audio circuit 506, a wireless fidelity (WiFi) module 507, a processor 508 including one or more processing cores, a power source 509 and other components. It could be understood by the persons skilled in the art that the structure of the terminal device 100 shown in FIG. 8 does not limit the terminal device 100, and the terminal device may include components more or less than the illustrated components or a combination of some components, or other arrangements of components.

The RF circuit 501 can be used to receive and transmit a message or to receive and transmit a signal during a call. Especially, when downlink information from a base station is received, the RF circuit sends the downlink information to the one or more processors 508 for processing, and additionally sends uplink data to a base station. Usually, the RF circuit 501 includes but is not limited to an antenna, at least one amplifier, a tuner, one or more oscillator, a subscriber identity module (SIM) card, a transceiver, a coupler, a low noise amplifier (LNA), a duplexer, etc. In addition, the RF circuit 501 can communicate with the network and other devices via wireless communication. The wireless communication can employ any communication standard or protocol, including but not limited to global system of mobile communication (GSM), general packet radio service (GPRS), code division multiple access (CDMA), wideband code division multiple access (WCDMA), long term evolution (LTE), e-mail, short messaging service (SMS), etc.

The memory 502 can be used to store application programs and data. The application programs stored in the memory 502 includes executable codes. The application programs can be combined into modules having various functions. The processor 508 performs various function applications and data processing by running the application programs stored in the memory 502. The memory 502 can mainly include a program storage area and a data storage area. The program storage area can store an operating system, at least one application program required for a function (such as a voice playback function, an image playback function and etc.) and the like. The data storage area can store data (such as audio data, contacts and etc.) created according to the use of the terminal device 100. In addition, the memory 502 can include a high-speed random access memory, and can also include a non-volatile memory, such as at least one disk storage device and flash memory device, or include other volatile solid state memory devices. Correspondingly, the memory 502 can further include a memory controller to provide access to the memory 502 by the processor 508 and the input unit 503.

The input unit 503 can be configured to receive incoming numbers, character information, or characteristic information (such as fingerprint) from a user, and generate a keyboard, mouse, joystick, optical or trackball signal input related to user settings and function control. Specifically, in a specific embodiment, the input unit 503 can include a touch-sensitive surface and other input devices. The touch-sensitive surface, also known as a touch screen 110 or touchpad, can collect a touch operation made by a user on or near the touch-sensitive surface (for example, an operation made by the user on the touch-sensitive surface or near the touch-sensitive surface by means of a finger, a touch pen or any other suitable object or accessory), and drive a corresponding coupling device according to a preset program. Optionally, the touch-sensitive surface can include two portions, i.e. a touch detection device and a touch controller. The touch detection device is configured to detect a touch position from the user and a signal caused by the touch operation, and sends the signal to the touch controller. The touch controller receives touch information from the touch detection device, converts the touch information into a coordinate of a touch point, and sends the coordinate to the processor 508. The touch controller also can receive a command sent from the processor 508 and execute the command.

The display unit 504 may be configured to display information input by or provided to the user, and various graphic user interfaces of the terminal device 100. These graphic user interfaces can consist of a graph, a text, an icon, a video, and any combination thereof. The display unit 504 can include a display panel, and optionally, the display panel can be configured in forms of a liquid crystal display (LCD), an organic light-emitting diode (OLED) and the like. Further, the touch-sensitive surface can overlay the display panel; when the touch-sensitive surface detects a touch operation on or near it, the touch operation is sent to the processor 508 to determine the type of the touch event, and then the processor 508 provides corresponding visual output on the display panel according to the type of the touch event. Although in FIG. 8, the touch-sensitive surface and the display panel implement input and output functions in a form of two independent parts, but in some embodiments, the touch-sensitive surface and the display panel can be integrated to implement input and output functions. It could be understood that, the display can include the input unit 503 and the display unit 504.

The terminal device 100 can also include at least one sensor 505, such as a light sensor, a motion sensor, and other sensors. Specifically, the light sensor may include an ambient light sensor and a proximity sensor. The ambient light sensor adjusts luminance of the display panel based on intensity of an ambient light. The proximity sensor can turn off the display panel and/or backlight when the terminal device 100 moves to an ear. As one of the motion sensors, a gravity sensor can detect acceleration in various directions (generally in the axes), and can detect the value and direction of gravity in a static state. The gravity sensor can be used for posture recognition (such as switch between landscape and portrait, posture calibration for a related game and a magnetometer) of a phone, and functions (such as a pedometer and a knock) related to vibration recognition. The terminal device 100 can also be provided with a gyroscope, a barometer, a hygrometer, a thermometer, an infrared sensor and other sensors, which will not be elaborated herein.

The audio circuit 506 can provide an audio interface between the user and the terminal device 100 by means of a loudspeaker and a microphone. The audio circuit 506 can transmit an electrical signal converted from the received audio data to the loudspeaker, and the loudspeaker converts the electrical signal into an audio signal to be output. The microphone converts an audio signal collected into an electrical signal, the audio circuit 506 receives the electrical signal and converts it into the audio data, and transmits the audio data to the processor 508. After processed by the processor 508, the audio data is sent to another terminal device via the RF circuit 501, or output to the memory 502 for further processing. The audio circuit 506 can further include an earphone socket and provide communication between a peripheral earphone and the terminal device 100.

WiFi is a short distance wireless transmission technology, and the terminal device 100 can help the user send and receive e-mails, browse websites and access streaming media by means of the WiFi module 507 which provides the user with wireless broadband access to the Internet. Although the WiFi module 507 is shown in FIG. 8, but it could be understood that the WiFi module 507 is not essential for the terminal device 100 and can be omitted according to needs in a scope without changing the gist of the present disclosure.

The processor 508 is a control center of the terminal device 100, is coupled to various parts of the terminal device 100 by means of a variety of interfaces and lines, and performs various functions of the terminal device 100 and data processing by running or executing the application programs stored in the memory 502 and by invoking the data stored in the memory 502, thereby monitoring the terminal device 100 overall. Optionally, the processor 508 can include one or more processing cores. Preferably, the processor 508 can integrate an application processor and a modem processor, in which the application processor mainly handles the operating system, the user interface and the application program, while the modem processor mainly deals with wireless communication. It could be understood that, the modem processor may also not be integrated in the processor 508.

The terminal device 100 further includes the power source 509 that supplies power to various components. Preferably, the power source 509 can be logically coupled to the processor 508 through a power management system, thereby achieving management of charging, discharging, and power consumption and other functions through the power management system. The power source 509 can further includes one or more direct current or alternated current power sources, a recharge system, a power fault detection circuit, a power adapter or inverter, a power state indicator, and any the like components.

Although not shown in FIG. 8, the terminal device 100 may further include a Bluetooth module, etc., which will not be detailed here. In specific embodiments, the above modules can be realized as individual entities or one or some entities through any combination. Specific embodiments of the above modules can refer to the method embodiment, which will not be detailed here.

Various technical features in the above embodiments can be combined in any way, all of the possible combinations of the various technical features in the above embodiments are not described for the sake of brevity, and all the combinations of the technical features fall within the scope recited in the specification provided that they are compatible.

The above embodiments, which are described specifically and in detail, are only some implementations of the present application, and cannot be construed as limitations to the scope of the present application. It should be noted that, the persons skilled in the art can also make some modifications and improvements without departing from concept of the present application, and all of which should be considered to belong to the protection scope of the present application. Therefore, the protection scope of the present application shall be subject to the claims.

What is claimed is:

1. A casing assembly, comprising:
   a rear casing comprising an outer surface and an inner surface opposite the outer surface, the rear casing defining a mounting hole through the outer surface and the inner surface; and
   a wearproof assembly comprising a coupling member and a decorative member, the coupling member being coupled to the rear casing passing through the mounting hole and defining a recess at a side of the coupling member opposite the inner surface, the decorative member being embedded in the recess and fixedly coupled to the coupling member, and the coupling member and the decorative member protruding from the outer surface,
   wherein the rear casing comprises an outer layer and an inner layer coupled to the outer layer, the outer surface is positioned at the outer layer, and the inner surface is positioned at the inner layer, and wherein the outer layer is transparent, the inner layer defines a light through hole, and ambient light can penetrate the outer layer from the outer surface and emit from a side of the inner surface through the light through hole.

2. The casing assembly according to claim 1, wherein the coupling member is configured to shield the mounting hole.

3. The casing assembly according to claim 1, wherein the coupling member comprises a body passing through the mounting hole and a boss positioned at a periphery of the body, the body and the boss are integrally formed, and the boss is positioned at a side where the inner surface is and the recess is positioned in the body.

4. The casing assembly according to claim 1, wherein the coupling member comprises a body passing through the mounting hole and coupled to the rear casing and a boss positioned at a periphery of the body, the body and the boss are integrally formed, and the boss is positioned at a side where the outer surface is and the recess is positioned in the boss.

5. The casing assembly according to claim 1, wherein the coupling member is adhered to the inner surface of the rear casing by means of a double-sided tape or in a dispensing manner.

6. The casing assembly according to claim 1, wherein portions of the decorative member and the coupling member protruding from the outer surface are rounded, such that the decorative member has a spherical exposed end face, and the coupling member has an end face protruding from the outer surface and capable of coupled to a spherical face of the decorative member.

7. The casing assembly according to claim 1, wherein the decorative member has a cross sectional shape matches a cross sectional shape of the recess.

8. The casing assembly according to claim 1, wherein the coupling member is made of stainless steel, aluminum alloy, ceramic, or plastic, and the decorative member is made of glass, ceramic, or plastic.

9. The casing assembly according to claim 8, wherein the decorative member is made of transparent glass, and a pattern layer is arranged on a surface of the decorative member attached to a bottom of the recess.

10. A casing assembly, comprising:
a rear casing comprising an outer surface and an inner surface opposite the outer surface, the rear casing defining a mounting hole through the outer surface and the inner surface; and
a wearproof assembly comprising a coupling member and a decorative member, the coupling member passing through the mounting hole and shielding the mounting hole, the coupling member defines a groove at an end of the coupling member opposite the inner surface, the decorative member being embedded in the groove and fixedly coupled to the coupling member, and the coupling member and the decorative member protruding from the outer surface,
wherein the rear casing comprises an outer layer and an inner layer coupled to the outer layer, the outer surface is positioned at the outer layer, and the inner surface is positioned at the inner layer, and
wherein the outer layer is transparent, the inner layer defines a light through hole, and ambient light can penetrate the outer layer from the outer surface and emit from a side of the inner surface through the light through hole.

11. The casing assembly according to claim 10, wherein the decorative member is fixedly coupled to the coupling member by means of a double-sided tape or in a dispensing manner.

12. A mobile terminal, comprising:
a casing assembly, the casing assembly comprising:
a rear casing, the rear casing comprising an outer surface and an inner surface opposite the outer surface, the rear casing defining a mounting hole through the outer surface and the inner surface, and
a wearproof assembly comprising a coupling member and a decorative member, the coupling member being coupled to the rear casing passing through the mounting hole and defining a recess at a side of the coupling member opposite the inner surface, the decorative member being embedded in the recess and fixedly coupled to the coupling member, the coupling member and the decorative member protruding from the outer surface; and
a display screen having a display area, the casing assembly being positioned at a side of the display screen facing away from the display area of the display screen,
wherein the rear casing comprises an outer layer and an inner layer coupled to the outer layer, the outer surface is positioned at the outer layer, and the inner surface is positioned at the inner layer, and
wherein the outer layer is transparent, the inner layer defines a light through hole, and ambient light can penetrate the outer layer from the outer surface and emit from a side of the inner surface through the light through hole.

13. The mobile terminal according to claim 12, wherein the mobile terminal comprises a camera module positioned at a side of the rear casing facing away from the outer surface, and ambient light can penetrate the outer layer from the outer surface and emit to the camera module through the light through hole.

14. The mobile terminal according to claim 13, wherein the camera module has a light hole, the light hole has an orthographic projection on the outer surface of the rear casing, the wearproof assembly has an orthographic projection on the outer surface of the rear casing, and the orthographic projection of the light hole is outside the orthographic projection of the wearproof assembly.

15. The mobile terminal according to claim 12, wherein the coupling member comprises a body passing through the mounting hole and a boss positioned at a periphery of the body, the body and the boss are integrally formed, and the boss is positioned at a side where the inner surface is and the recess is positioned in the body.

16. The mobile terminal according to claim 15, wherein the decorative member has a circular, rectangular, or triangular cross section, and the body has a circular, rectangular, or triangular cross section.

17. The mobile terminal according to claim 12, wherein the coupling member comprises a body passing through the mounting hole and coupled to the rear casing and a boss positioned at a periphery of the body, the body and the boss are integrally formed, and the boss is positioned at a side where the outer surface is and the recess is positioned in the boss.

18. The mobile terminal according to claim 12, wherein the coupling member is configured to shield the mounting hole.

* * * * *